United States Patent [19]

Ferletic

[11] Patent Number: 5,103,541
[45] Date of Patent: Apr. 14, 1992

[54] MILLING MACHINE STOP-BAR FOR USE WITH REVERSING TAPPING ATTACHMENTS

[75] Inventor: Oscar F. Ferletic, Seal Beach, Calif.

[73] Assignee: Ostic Tool and Engineering, Inc., Los Alamitos, Calif.

[21] Appl. No.: 718,272

[22] Filed: Jun. 20, 1991

[51] Int. Cl.⁵ ............... B23Q 5/54; B23C 9/00; B23G 3/00
[52] U.S. Cl. .................... 29/57; 51/241 R; 408/139; 409/218
[58] Field of Search ............ 29/26 A, 57, 65; 409/233, 235, 196, 218, 134, 241; 51/241 R, 262 R, 268, 165.78; 408/140, 139, 138, 137; 248/124, 279, 662

[56] References Cited

U.S. PATENT DOCUMENTS

| | | | |
|---|---|---|---|
| 3,876,174 | 4/1975 | Culver | 248/124 |
| 3,998,565 | 12/1976 | Tanaka | 408/140 X |
| 4,456,412 | 6/1984 | Ford et al. | 409/233 |
| 4,579,487 | 4/1986 | Lehmkuhl | 409/196 X |
| 4,911,588 | 3/1990 | Ikemoto et al. | 408/137 |

FOREIGN PATENT DOCUMENTS 1427295  4/1970  Fed. Rep. of Germany ...... 408/140

*Primary Examiner*—William Briggs
*Attorney, Agent, or Firm*—Price, Gess & Ubell

[57] ABSTRACT

Certain tapping and jig grinding attachments to drill presses on Bridgeport Mills, for example, require a stop-bar to operate properly. The stop-bar described quickly and easily attaches to the lower inside of the mill ram, and functions to hold the stop arm of a tapping attachment like a Tapmatic ® without interfering with spindle travel or requiring repositioning as the result of worktable position changes.

8 Claims, 2 Drawing Sheets

MILLING MACHINE STOP-BAR FOR USE WITH REVERSING TAPPING ATTACHMENTS

BACKGROUND OF THE INVENTION

1. Field of the Invention

The present invention relates generally to improvements in stop-bars for tapping and jig grinding units designed for use with Bridgeport-type machines.

2. Description of the Prior Art

The Tapmatic Corporation of Irvine, Calif. manufactures a reversing tapping attachment of various sizes which fit drill presses or milling machines. This tapping attachment can be used on all types of manually operated machines with rotating, nonreversing spindles. It can also be used in many applications that are automated or semiautomated, such as airfeed drill units.

The tapping attachment of Tapmatic Corporation incorporates in its design a planetary gear reverse. In order for this attachment and, specifically, the reversing mechanism of the attachment, to work, it is extremely important that the short stop arm furnished with the unit be utilized. The stop arm must engage a strong torque bar which is usually attached to either the machine quill or machine table. Neither the workpiece being tapped by the attachment nor the stop arm must be held by hand. The full power of the drilling or milling machine is transmitted to the attachment in reverse.

The torque bar that engages the stop arm of the tapping attachment must be sufficiently strong to withstand the entire force of the milling machine that is being transmitted through the tapping attachment. The torque bar mechanisms recommended by the Tapmatic Corporation for use with the tapping attachment mount the torque bar either to the machine quill or spindle, or to the torque table.

The stop-bar mechanisms recommended by Tapmatic Corporation and others in the industry restrict travel of the quill and/or maneuverability of the machine worktable.

The stop-bar mechanism of the present invention, however, provides a strong and adjustable stop-bar which will allow a machine worktable to be positioned on any coordinate of its range without interfering with, or having to adjust or relocate the stop-bar. Moreover, the stop-bar of the present invention does not restrict any spindle travel, and can be installed and removed without the use of any tools, simply and quickly.

SUMMARY OF THE INVENTION

The stop-bar of the present invention has an aluminum cast body which attaches by a first end to the main body of the mill at the lower inside of the ram. The stop-bar slips onto the ram track and is held to the track by a screw-driven plug. The plug is moved towards and away from the track by a manually activated handle. A rod, contained in an aperture at the second end of the stop-bar, is held in a fixed up-down position by a set screw. The rod length may be adjusted at will.

BRIEF DESCRIPTION OF THE DRAWINGS

The exact nature of this invention, as well as the objects and advantages, will become readily apparent from consideration of the following specification when considered in conjunction with the accompanying drawings, in which like reference numerals designate like parts throughout the figures thereof, and wherein.

DESCRIPTION OF THE PREFERRED EMBODIMENTS

Figure 1:
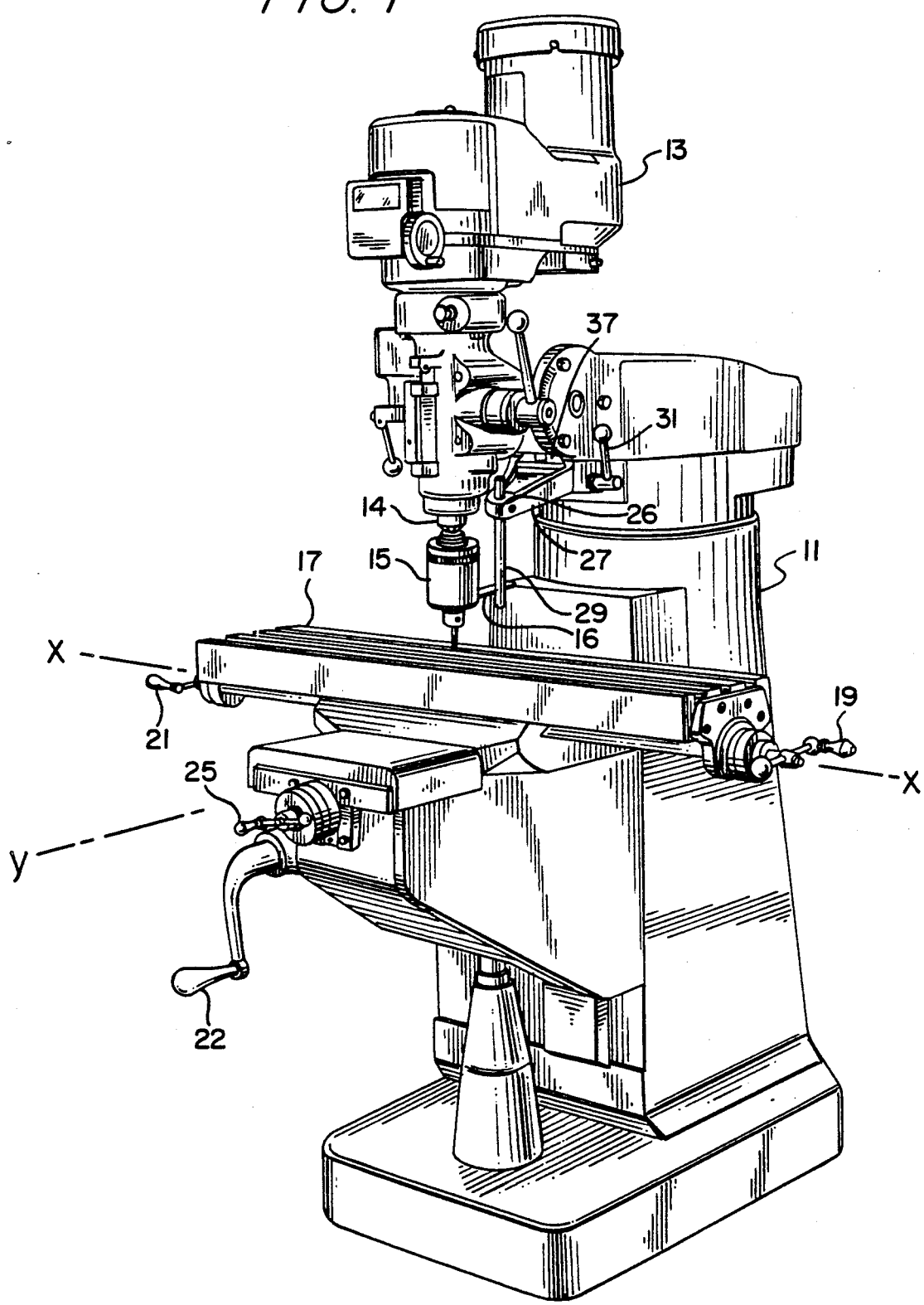
FIG. 1 is a perspective of a Bridgeport milling machine utilizing a Tapmatic ® attachment in conjunction with the stop-bar mechanism of the present invention.

The stop-bar mechanism according to the present invention may be used in a Bridgeport milling machine 11, as shown in FIG. 1, or in any other manual or automatic milling machine which has a ram track 37 on which the head 13 of the milling machine is mounted.

The tapping unit 15, which may be manufactured by Tapmatic Corporation, is attached to the quill or spindle 14 in the head 13 of the Bridgeport machine. The tapping mechanism 15 has, as a part of its overall structure, a stop arm 16, which needs to be held in place so that the tapping attachment 15 allows the tap to penetrate the workpiece and perform its reversing operation upon reaching the desired depth and the tapping attachment is pulled back.

A workpiece (not shown) is normally clamped to machine table 17, which can be moved in an X and Y direction by cranks 19, 21, and 25. Cranks 19 and 21 move the table in an X direction. Crank 25 moves the table in a Y direction. Crank 22 moves the table 17 up and down to the desired position.

The stop-bar mechanism 26 of the present invention attaches to the ram 37 of the Bridgeport machine. A bar 29 is held firmly by the body 27 of the stop-bar mechanism 26.

Figure 2:
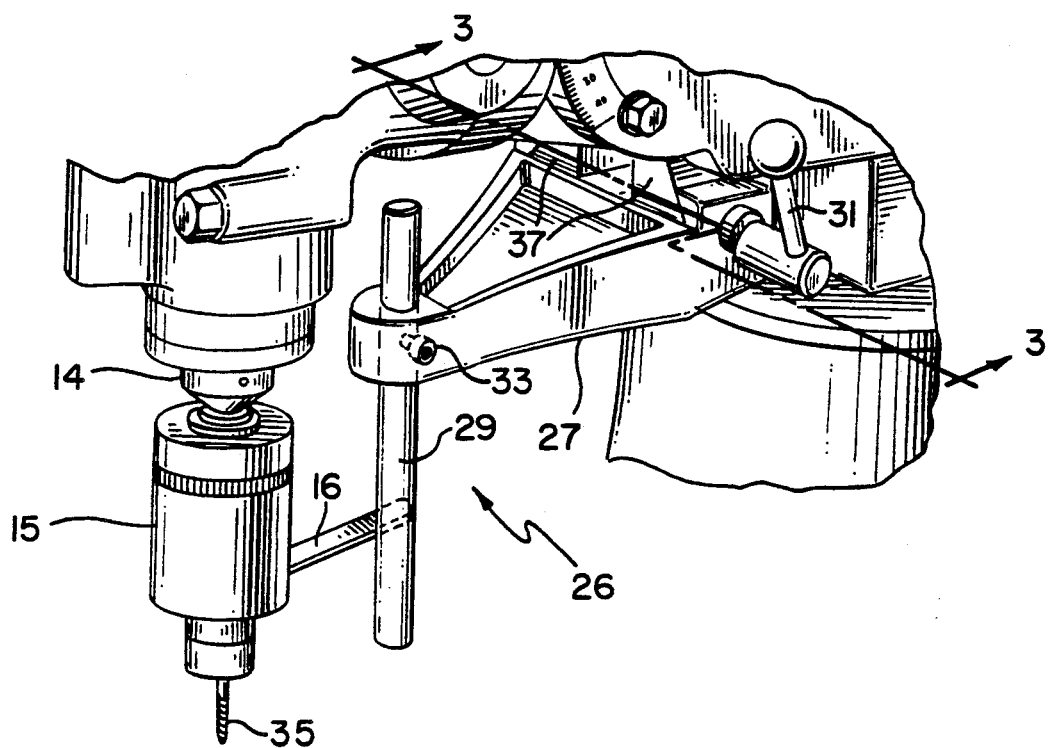
FIG. 2 is a perspective blow-up of the Tapmatic ® and stop-bar mechanism portion of FIG. 1.

Refer now to FIG. 2, which illustrates in greater detail the relationship between the tapping attachment 15, its stop arm 16, and the stop-bar 26. The stop-bar 26 is slipped onto the ram 37 of the Bridgeport machine and quickly and firmly clamped thereto by manipulation of handle 31. The body 27 of the stop-bar mechanism holds a bar 29 within an aperture of body 27 by way of a set screw 33 or other convenient fastening means, which can be easily adjustable. The bar 29 is adjusted in length to reach stop arm 16 throughout its travel along the Y axis. Stop arm 16 thus rides up and down in contact with the bar 29 as the tapping attachment 15 is raised and lowered by the Bridgeport machine. In this manner, it can be seen that the up-down travel of the spindle is not interfered with in any manner. Moreover, because the stop-bar mechanism 26 is clamped to the lower inside end of the machine ram 37, it does not come into contact with, nor interfere in any way with, the movement of the machine worktable 17 (FIG. 1).

But perhaps most important is the safety aspect of this device. Because it is extremely strong and capable of handling the full torque forces of the machine itself and easily installed, the risk to the operator is greatly reduced. The prior art devices, according to this inventor's experience, very often fail to stay in place, allowing the stop arm 16 to rotate, sometimes causing injury to the operator as a result.

Figure 3:
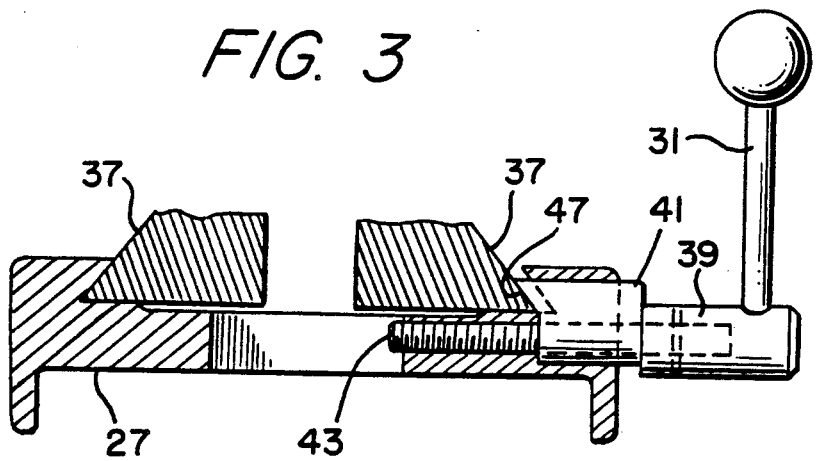
FIG. 3 is a cross-sectional view of the stop-bar mechanism of FIG. 2 taken along cross-sectional line 3—3.

The preferred clamping mechanism utilized by the stop-bar 26 is more clearly illustrated in FIG. 3. The body 27 of the stop-bar 26 is clamped onto the lower inside of the machine ram 37. The clamping end of the body 27 is shaped to accommodate ram 37. Riding within an aperture transverse to the main axis of ram 37 is a brake plug 41 that has a braking face 45 for bearing on an outside surface of ram 37. Brake plug 41 has an aperture therein through which a bolt 43 freely passes. Bolt 43 is fixedly attached to an end cap 39 and threadably engages the body 27. A handle 31 is fixedly attached to end cap 39, allowing an operator to rotate end cap 39 and bolt 43, thereby threading it further into the body 27 of stop-bar 26. This causes the brake plug 45 to come to bear on the outside surface of ram 37 by forcing the entire stop-bar mechanism 26 to be rigidly held and to absorb all vibrations, even under extreme operation.

The body 27 of the stop-bar is preferably made out of sand cast aluminum alloy, which is burnished and machined to fit the brake plug 41 and the rod 29. Rod 29 is preferably made of steel alloy as well, and is cadmium plated for protection and durability. Brake plug 41, end cap 39, and handle 31 are all preferably made out of a steel alloy. Bolt 43 is preferably made out of a steel alloy and cadmium plated for protection and self-lubrication.

As a result of the present stop-bar mechanism, risky setups for the reversing tapping attachment are eliminated. Moreover, time consuming, very difficult, and sometimes impossible stop-bar setups are avoided. The stop-bar of the present invention stands out for the rigidity of its entire construction, and eliminates vibrations and all the risks noted above, not the least of which is the safety of the operator. The ability of a quick and sure installation and removal for the stop-bar and, once installed, its lack of interference with either the worktable or the spindle, are features that simply have not been found in the prior art.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A stop-bar mechanism for use on milling machines having a ram on which the head of the milling machine, carrying a spindle, is mounted, said stop-bar mechanism providing a stop for the stop arm of a tapping or grinding mechanism attached to said spindle, said stop-bar mechanism comprising:
   a body having a first end and a second end, said first end being adapted to fit on the ram of said milling machine, said second end having an aperture therein at right angles to the plane of said body;
   a screw-driven plug located at said first end of said body to bear upon the ram and removably hold the body fast to said ram; and
   a rod sized to fit in the aperture at the second end of said body.

2. The stop-bar mechanism of claim 1 further comprising a fastening means located at the second end of said body placed to bear upon said rod when located in the aperture, thereby allowing the rod to be freely placed in various down locations with respect to said body.

3. The stop-bar for mechanism of claim 2 wherein said screw-driven plug includes a handle thereon for hand tightening of said plug against the ram.

4. The stop-bar mechanism of claim 3 wherein said fastening means comprises a set screw.

5. The stop-bar mechanism of claim 1 wherein said body is sand cast aluminum alloy and structured to absorb vibration under extreme conditions.

6. The stop-bar mechanism of claim 5 further comprising a fastening means located at the second end of said body placed to bear upon said rod when located in the aperture, thereby allowing the rod to be freely placed in various down locations with respect to second body.

7. The stop-bar mechanism of claim 6 wherein said screw-driven plug includes a handle thereon for hand tightening of said plug against the ram.

8. The stop-bar mechanism of claim 7 wherein said fastening means comprises a set screw.

* * * * *